(12) United States Patent
Iseki et al.

(10) Patent No.: US 10,406,974 B2
(45) Date of Patent: Sep. 10, 2019

(54) COURTESY LAMP AND COURTESY LOGO LAMP

(71) Applicant: MURAKAMI CORPORATION, Shizuoka (JP)

(72) Inventors: Kota Iseki, Shizuoka (JP); Dong Van Dinh, Yaizu (JP)

(73) Assignee: MURAKAMI CORPORATION, Shizuoka (JP)

( * ) Notice: Subject to any disclaimer, the term of this patent is extended or adjusted under 35 U.S.C. 154(b) by 0 days.

(21) Appl. No.: 15/921,065

(22) Filed: Mar. 14, 2018

(65) Prior Publication Data

US 2018/0281674 A1    Oct. 4, 2018

(30) Foreign Application Priority Data

Mar. 31, 2017    (JP) .................................. 2017-069580

(51) Int. Cl.
*B60Q 3/62*    (2017.01)
*B60Q 3/217*    (2017.01)
(Continued)

(52) U.S. Cl.
CPC .............. *B60Q 3/62* (2017.02); *B60Q 1/2607* (2013.01); *B60Q 1/2696* (2013.01); *B60Q 1/323* (2013.01); *B60Q 1/50* (2013.01); *B60Q 3/217* (2017.02); *B60Q 3/64* (2017.02); *F21S 43/14* (2018.01); *F21S 43/237* (2018.01); *F21S 43/243* (2018.01); *F21S 43/247* (2018.01); *F21S 43/26* (2018.01); *G02B 6/002* (2013.01);
(Continued)

(58) Field of Classification Search
CPC .... B60Q 1/0011; B60Q 1/2669; B60Q 1/323; B60Q 3/217; B60Q 3/51; B60Q 3/62; F21S 41/24
See application file for complete search history.

(56) References Cited

U.S. PATENT DOCUMENTS 5,077,643 A * 12/1991 Leach .................... B60Q 1/323
                                                                  362/155
5,193,895 A *  3/1993 Naruke .................. B60Q 1/323
                                                                  362/249.01
(Continued)

FOREIGN PATENT DOCUMENTS

JP    2010-30336    2/2010
JP    3168083       6/2011

*Primary Examiner* — Alexander K Garlen
(74) *Attorney, Agent, or Firm* — Greenblum & Bernstein, P.L.C.

(57) ABSTRACT

A courtesy logo lamp or a courtesy lamp is installed in a part on the interior side of a door of a vehicle. The courtesy logo lamp or the courtesy lamp includes a light source, a light guide and an outer lens. The light guide includes a light input surface that allows input of light from the light source, a light guide portion that guides light input from the light input surface, and a light output surface that allows output of the light guided by the light guide portion. The outer lens includes a transmission/diffusion portion. The transmission/diffusion portion allows input of the light output from the light output surface of the light guide, from a back surface, penetration of the light in the thickness direction and diffusion of the light, and radiation of the light from the front surface to the outside.

17 Claims, 6 Drawing Sheets

DIFFUSION OF COURTESY LAMP LIGHT BY ENTIRE LENS CUTS

(51) Int. Cl.
*F21V 8/00* (2006.01)
*B60Q 1/26* (2006.01)
*B60Q 1/32* (2006.01)
*B60Q 1/50* (2006.01)
*B60Q 3/64* (2017.01)
*F21S 43/14* (2018.01)
*F21S 43/20* (2018.01)
*F21S 43/237* (2018.01)
*F21S 43/243* (2018.01)
*F21S 43/247* (2018.01)
*F21W 103/60* (2018.01)

(52) U.S. Cl.
CPC ......... *G02B 6/0051* (2013.01); *G02B 6/0096* (2013.01); *B60Q 2400/40* (2013.01); *B60Q 2400/50* (2013.01); *F21W 2103/60* (2018.01)

(56) References Cited

U.S. PATENT DOCUMENTS

| | | | | |
|---|---|---|---|---|
| 5,206,562 | A * | 4/1993 | Matsuno | B60Q 1/323 307/10.8 |
| 6,158,869 | A * | 12/2000 | Barnes, Jr. | B60Q 1/323 362/501 |
| 2012/0134173 | A1 * | 5/2012 | Mueller | G02B 6/0021 362/602 |
| 2016/0356450 | A1 * | 12/2016 | McClelland | B60Q 3/60 |
| 2017/0210275 | A1 * | 7/2017 | Kubo | B60R 13/02 |

* cited by examiner

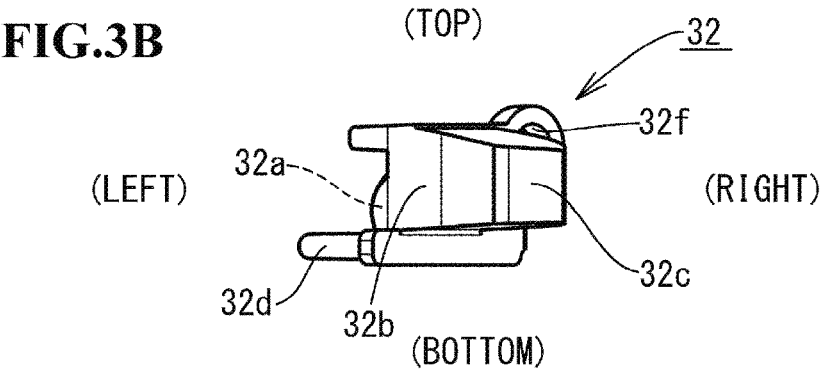
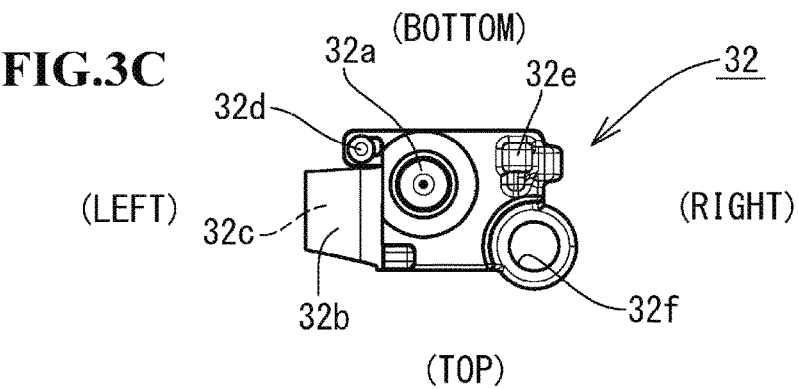
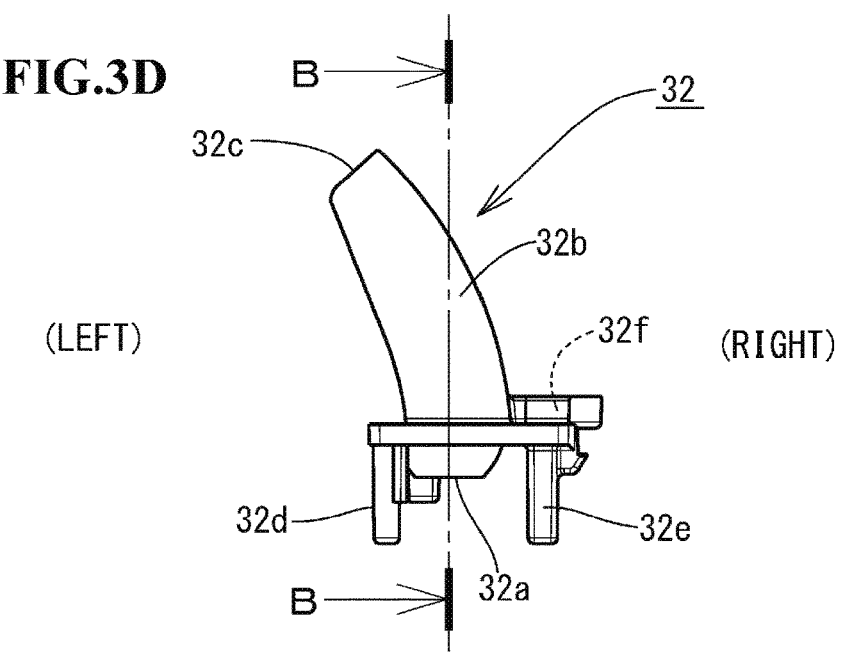

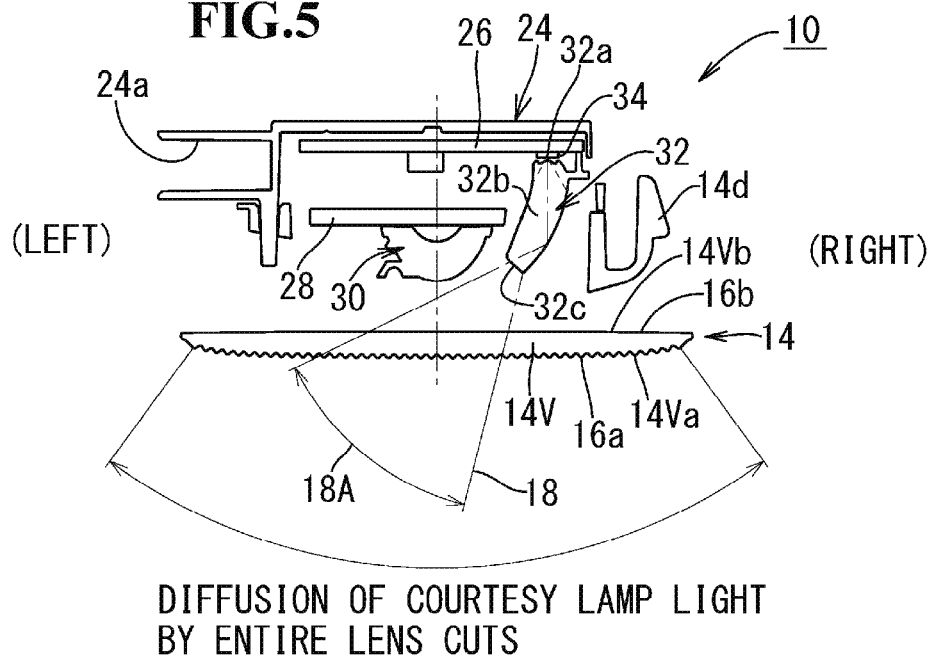
DIFFUSION OF COURTESY LAMP LIGHT BY ENTIRE LENS CUTS
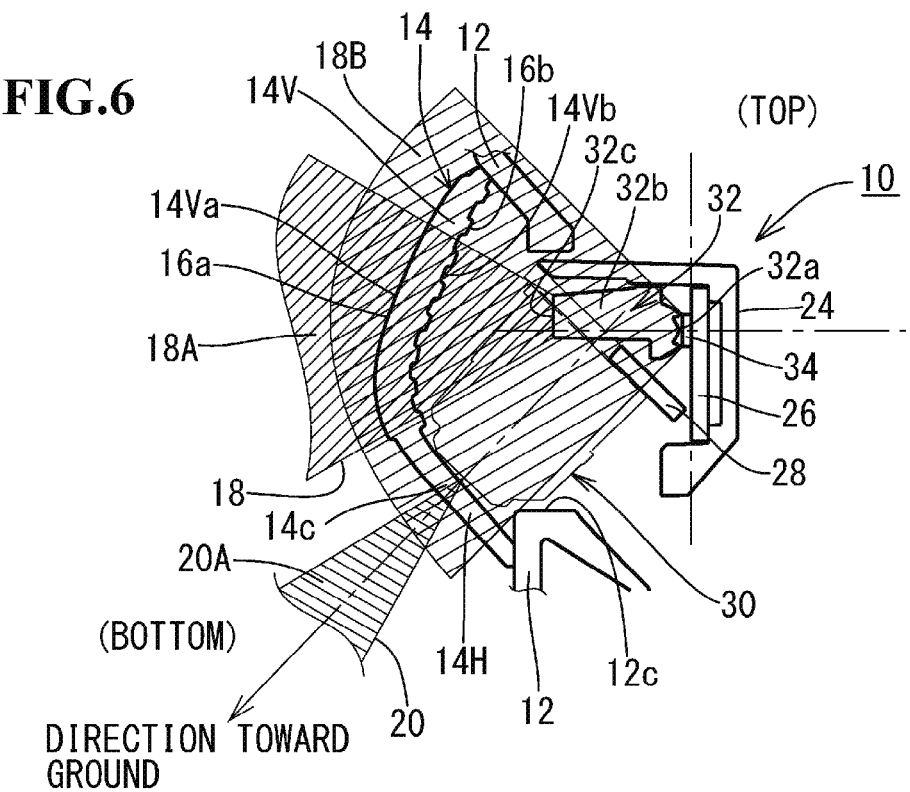
DIRECTION TOWARD GROUND

COURTESY LAMP AND COURTESY LOGO LAMP

The disclosure of Japanese Patent Application No. JP2017-069580 filed on Mar. 31, 2017 including the specification, drawings, claims and abstract is incorporated herein by reference in its entirety.

BACKGROUND OF THE INVENTION

1. Field of the Invention

This invention relates to a courtesy lamp and a courtesy logo lamp, which are lighting fixtures to be installed in a door of a vehicle, the courtesy lamp and the courtesy logo lamp enabling provision of a wide light-emitting surface without using a large-size light guide while ensuring flexibility in controlling a radiation direction and/or a radiation range of courtesy lamp light.

2. Description of the Related Art

A courtesy lamp is a lighting fixture installed in a part on the interior side of a vehicle door, and when the door is open, is turned on and thereby serves to illuminate the feet of a person getting on or off the vehicle and urge following vehicles to take precautions, e.g., at night. Also, a courtesy logo lamp is a lighting fixture resulting from incorporating and thereby integrating what is called a logo lamp that projects an image of, e.g., a logo representing a vehicle brand name on the ground around the vehicle, in a courtesy lamp. A common courtesy lamp that is conventionally in practical use is one formed by just covering a light source by an outer lens provided with, e.g., lens cuts. However, a courtesy lamp having such structure is poor in flexibility in controlling a radiation direction and/or a radiation range of courtesy lamp light. Examples of conventional courtesy lamps having enhanced flexibility in controlling a radiation direction and/or a radiation range of courtesy lamp light include one described in Japanese Patent Laid-Open No. 2010-030336. This courtesy lamp is configured to guide light from a light source via a light guide plate to radiate the light to the outside in an arbitrary direction.

Example of conventional courtesy logo lamps includes one described in Japanese Utility Model Registration No. 3168083. This courtesy logo lamp has a structure in which a light source for a courtesy lamp and a logo lamp module (that is, one resulting from components of a logo lamp being partly or fully assembled and unitized) are divided by a partition sheet.

Courtesy lamps need to include a light-emitting surface having a certain wide degree of width so as to look prominent as viewed from following vehicles. The courtesy lamp described in Japanese Patent Laid-Open No. 2010-030336 includes a wide light-emitting surface and thus needs a large-size light guide plate. Also, the courtesy logo lamp described in Japanese Utility Model Registration No. 3168083 is poor in flexibility in controlling a radiation direction and/or a radiation range of courtesy lamp light. Therefore, there is a problem of interference between light of an image of, e,g., a logo and courtesy lamp light, resulting in blurring of the image of, e.g., a logo. In order to solve this problem, a partition sheet is essential.

This invention solves the aforementioned problems in the conventional techniques and provides a courtesy lamp and a courtesy logo lamp configured so as to provide a wide light-emitting surface without using a large-size light guide while ensuring flexibility in controlling a radiation direction and/or a radiation range of courtesy lamp light.

SUMMARY OF THE INVENTION

This invention provides a courtesy lamp to be installed in a part on an interior side of a door of a vehicle, the courtesy lamp including a light source, a light guide and an outer lens, wherein: the light guide includes a light input surface that allows input of light from the light source, a light guide portion that guides the light input from the light input surface, and a light output surface that allows output of the light guided by the light guide portion; and the outer lens includes a transmission/diffusion portion that allows the light output from the light output surface of the light guide to enter a back surface of the outer lens, penetrate the outer lens in a thickness direction, diffuse in the outer lens and radiate from a front surface of the outer lens to an outside. Accordingly, a radiation direction and/or a radiation range of light can be controlled by the light guide to cause the light to enter the outer lens and penetrate the outer lens and diffuse. Therefore, the transmission/diffusion portion of the outer lens is caused to shine widely using a small-size light guide, enabling provision of a wide light-emitting surface.

In the courtesy lamp according to this invention, it is possible that the light output surface of the light guide is disposed at a position substantially away (that is, a position a predetermined distance away) from the back surface of the outer lens, and the light output from the light output surface is directed to the back surface of the outer lens. Accordingly, the light output from the light output surface of the light guide can be caused to enter the back surface of the outer lens, with the cross-sectional area of the light increased, enabling the transmission/diffusion portion of the outer lens to shine more widely and uniformly.

In the courtesy lamp according to this invention, it is possible that the light guide includes the light input surface in one end surface in a longitudinal direction of the light guide and the light output surface in another end surface in the longitudinal direction. Accordingly, a position of the light source and a position of the light output surface of the light guide can be disposed so as to be away from each other, and thus, the position of the light source and the position of the light output surface of the light guide can be determined with little restriction on each other. Therefore, for example, an arrangement in which the light source is disposed at an end of a housing of the courtesy lamp and the light output surface is disposed in the vicinity of the center of the outer lens is possible. Consequently, a substrate with the courtesy lamp light source mounted thereon and the housing can be downsized.

In the courtesy lamp according to this invention, it is possible that: the light source is disposed at a position deviated from a center position in a left-right direction of the outer lens; and the light guide allows input of the light from the light source from the light input surface, guides the light via the light guide portion and allows output of the light from the light output surface toward the center position in the left-right direction of the outer lens back surface. Accordingly, a center of emission of courtesy lamp light can be arranged at the center position in the left-right direction of the outer lens while the light source being disposed at a position deviated from the center position in the left-right direction of the outer lens. Also, by forming the transmission/diffusion portion of the outer lens so as to have a symmetrical shape in the left-right direction, a same type of courtesy lamp can be used for either of right and left doors.

A courtesy logo lamp according to this invention includes the courtesy lamp according to this invention, a logo lamp module being assembled integrally with the courtesy lamp. Accordingly, the courtesy lamp according to this invention can be configured using a small-size light guide, and thus, even if a logo lamp module is assembled to the courtesy lamp, the courtesy logo lamp can be configured so as to be small in its entirety. Also, the radiation direction and the radiation angle of the courtesy lamp light can be controlled by the light guide, and thus the control of the radiation direction and the radiation angle enables an image projected by the logo lamp module to be prevented from being blurred by the courtesy lamp light. In addition, the radiation direction and the radiation angle of the courtesy lamp light can be controlled by the light guide, which can eliminate the need for a partition such as a partition sheet.

In the courtesy logo lamp according to this invention, it is possible that the light output surface of the light guide is disposed at a position enabling the light output from the light output surface to reach the transmission/diffusion portion of the outer lens without being blocked by the logo lamp module and/or a substrate with the logo lamp module mounted thereon. Accordingly, by adjusting a position of the light output surface from which the courtesy lamp light is output, by the light guide, it can be possible to avoid the courtesy lamp light from being blocked by the logo lamp module or the substrate with the logo lamp module mounted thereon. Consequently, the transmission/diffusion portion of the outer lens can be made to shine widely and thus, a wide light-emitting surface can be provided.

In the courtesy logo lamp according to this invention, it is possible that: the logo lamp module is arranged at the center position on the left-right direction of the outer lens; the light source is disposed at a position deviated from the center position in the left-right direction of the outer lens; and the light guide allows input of the light from the light source from the light input surface, guides the light via the light guide portion (for example, guides the light so as to avoid the logo lamp module) and allows output of the light from the light output surface toward the center position in the left-right direction of the back surface of the outer lens. Accordingly, the image from the logo lamp module can be projected from the center position in the left-right direction of the outer lens and the center of emission of the courtesy lamp light can be arranged at the center position in the left-right direction of the outer lens.

In the courtesy logo lamp according to this invention, it is possible that the transmission/diffusion portion of the outer lens has a symmetrical shape in a left-right direction, and an orientation of an image projected from the logo lamp module is set as a direction in which a person getting on or off the vehicle looks toward a surface on the interior side of the door. Accordingly, courtesy logo lamps of a same type can be used for both right and left doors. Also, if courtesy logo lamps of a same type are used for both right and left doors, the projected right and left logos can be made to appear in a same orientation with each other when the right logo is viewed from a person getting on or off the vehicle from the right door and when the left logo is viewed from a person getting on or off the vehicle from the left door.

BRIEF DESCRIPTION OF THE DRAWINGS

in FIGS. 3A to 3E, which are diagrams illustrating a structure of a light guide incorporated in the courtesy logo lamp in FIG. 1, FIG. 3A is a front view of the light guide (that is, a diagram as viewed in a direction that is the same as that of FIG. 4), FIG. 3B is a diagram of the light guide as viewed in a direction orthogonal to a light output surface, FIG. 3C is a back view of the light guide as viewed in a direction orthogonal to a light input surface, FIG. 3D is a bottom view of the light guide, and FIG. 3E is a cross-sectional view at the position indicated by arrows B-B in FIG. 3D;

FIG. 5 is a cross-sectional view at the position indicated by arrows A-A in FIG. 2, in which the courtesy logo lamp is cut along a plane extending through the optical axis of the courtesy lamp light source;

FIG. 6 is a cross-sectional view at the position indicated by arrows C-C in FIG. 4 and illustrates a state in which the courtesy logo lamp is installed in the door, FIG. 6 is a schematic diagram illustrating respective light output ranges of light output from the courtesy lamp light source, light output from the light output surface of the light guide and light output from a logo lamp module, and in FIG. 6, as in FIG. 4, the optical axis direction of light from the courtesy lamp light source (that is, the obliquely downward direction relative to the horizontal direction in a state in which the courtesy logo lamp is mounted on a vehicle) is arranged horizontally in the sheet;

DETAILED DESCRIPTION OF THE PREFERRED EMBODIMENTS

«Courtesy Logo Lamp»

Figure 2:
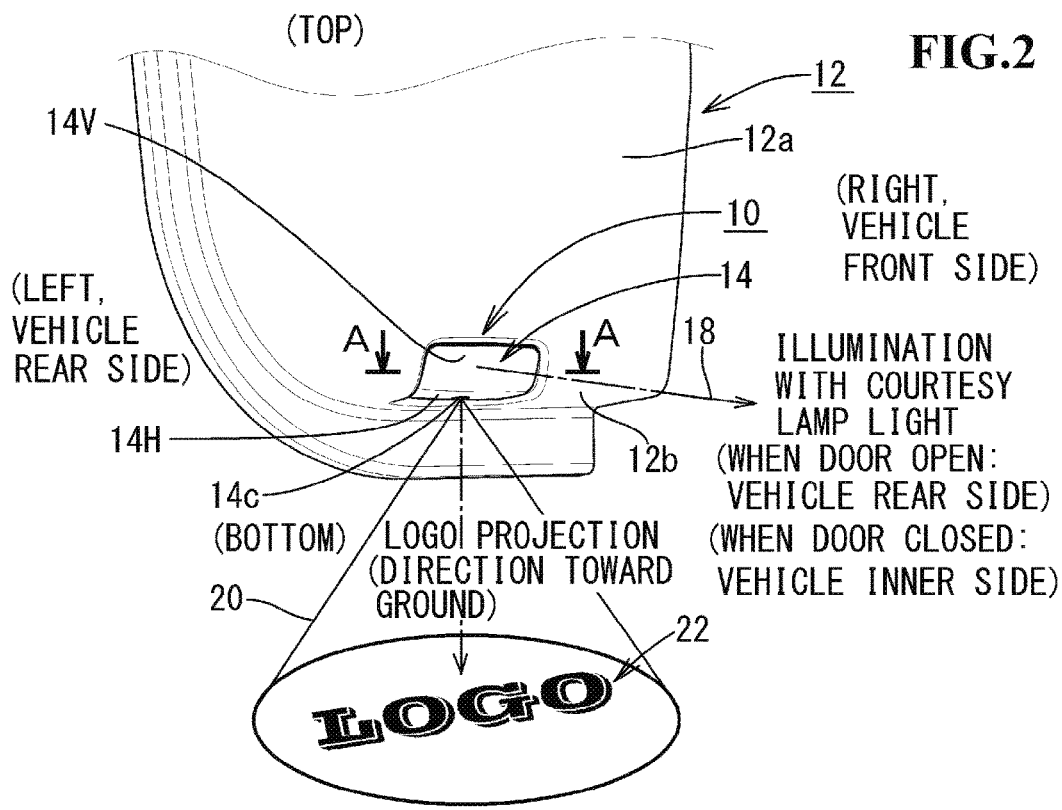
FIG. 2 is a perspective view illustrating a lower portion on the interior side of a vehicle door in which the courtesy logo lamp in FIG. 1 is installed.

An embodiment of a courtesy logo lamp according to this invention will be described below. FIG. 2 illustrates a lower portion on the interior side of a door trim of a door (front-side left door) 12 in which a courtesy logo lamp 10 according to this invention is installed. The courtesy logo lamp 10 is embedded and installed in a boundary part between a lower portion of a surface 12*a* on the interior side of the door 12 (more precisely, a door trim) and a lower surface 12*b* of the door 12. A front surface of an outer lens 14 of the courtesy logo lamp 10 is exposed to the outside. The outer lens 14 is formed by an integrally molded article using a transparent resin such as polycarbonate or PMMA (acrylic resin). A vertical cross-sectional shape of the outer lens 14 is a substantially L shape. Either or each of front and back surfaces of a vertical plate 14V positioned at a vertical side of the L shape is provided with lens cuts in its entirety. Consequently, the entire area of the vertical plate 14V forms a transmission/diffusion portion. At a center in a left-right direction of a lower plate 14H positioned at a lower side of the L shape, a transparent window 14*c* for logo projection is formed. In the entire area of the lower plate 14H except the transparent window 14c, a textured surface is formed so that an inner structure of the courtesy logo lamp 10 cannot be seen from the outside. Courtesy lamp light 18 is radiated from the courtesy logo lamp 10. The courtesy lamp light 18 is radiated mainly from the entire area of the vertical plate 14V (see FIG. 6). The courtesy lamp light 18 is radiated with a direction of a center of the radiation directed obliquely downward relative to a horizontal direction. A part of the courtesy lamp light 18 penetrates the textured surface of the lower plate 14H and is radiated also toward the ground; however, an amount of such part of the courtesy lamp light 18 is smaller than an amount of the courtesy lamp light 18 radiated from the vertical plate 14V. When the door 12 is open, the courtesy lamp light 18 is radiated toward the rearward direction of the vehicle in a horizontal direction and in an obliquely downward direction, thereby, at night, urging following vehicles to take precautions and properly illuminating the foot of a person getting on or off the vehicle. Also, when the door is closed, the courtesy lamp light 18 is radiated toward the inside direction of the vehicle in a horizontal direction and in an obliquely downward direction for a set length of time (for example, 20 to 30 seconds), and then automatically goes out upon lapse of the set length of time. Also, logo lamp light 20 is radiated toward the ground from the transparent window 14c in the lower plate 14H of the courtesy logo lamp 10, and a logo 22 is thereby projected on the ground. The courtesy lamp light 18 and the logo lamp light 20 simultaneously come on and simultaneously go out. This courtesy logo lamp 10 is configured to meet each of the following conditions so that the courtesy logo lamp 10 can be used for either of right and left doors.

(Conditions)

Outer lens 14 has a symmetrical shape in the left-right direction.

A center of emission of the courtesy lamp light 18 is disposed at a center position in the left-right direction of the outer lens 14.

The transparent window 14c is disposed at a center position in the left-right direction of the outer lens 14.

An orientation of the logo 22 is set as a direction in which a person getting on or off the vehicle looks toward the surface 12a on the interior side of the door 12 as illustrated in FIG. 2.

As a result of these conditions being met, the following state can be provided even if the courtesy logo lamp 10 is installed in either of the right and left doors.

The center of emission of the courtesy lamp light 18 in the outer lens 14 appears to be the center position in the left-right direction of the outer lens 14.

The logo lamp light 20 is output from the center position in the left-right direction of the outer lens 14.

The right and left logos appear in a same orientation with each other when viewed from persons getting on or off the vehicle from the right and left doors (that is, the orientation toward the surface 12a on the interior side of each of the left and right doors 12)

Additionally, if the logo 22 is set in an orientation rotated clockwise by 90 degrees from the orientation in FIG. 2, the orientation in which the logo appears is opposite between the left door and the right door. In other words, where the courtesy logo lamp 10 is installed in the left door, the logo 22 appears to be oriented toward the front side of the vehicle, and where the courtesy logo lamp 10 is installed at the right door, the logo 22 appears to be oriented toward the rear side of the vehicle (in a position where the door is closed in either case).

Figure 1:
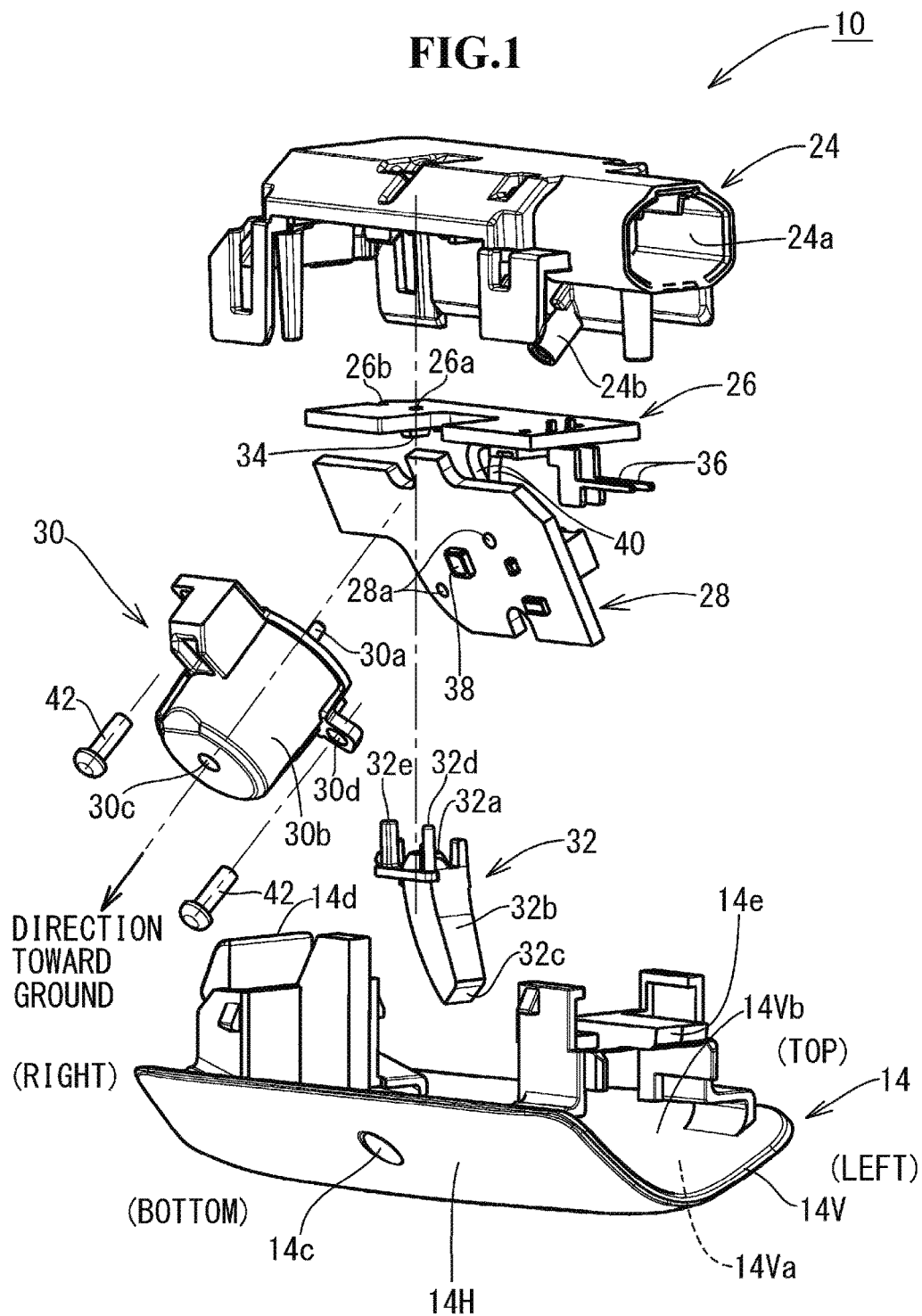
FIG. 1 is an exploded perspective view illustrating an embodiment of a courtesy logo lamp according to this invention.
Figure 3A:
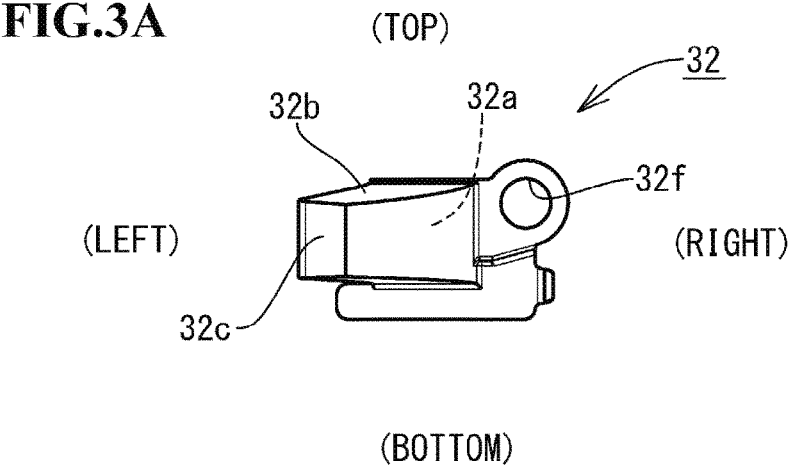
Figure 4:
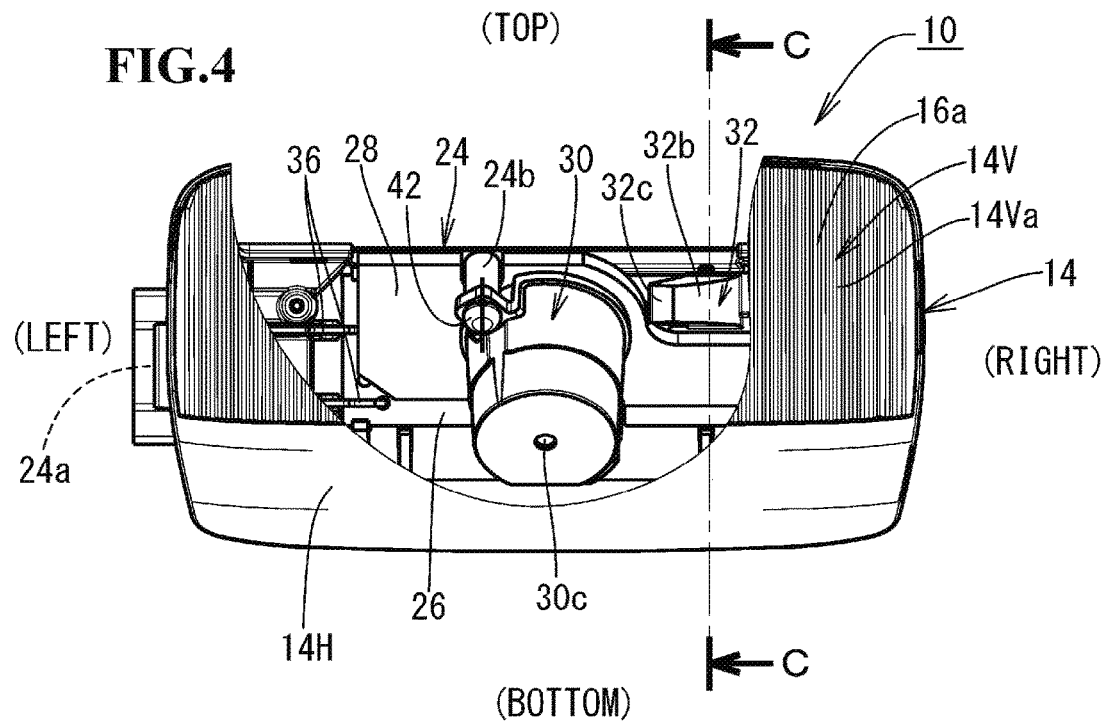
FIG. 4 is a front view of the courtesy logo lamp in FIG. 1 with an outer lens partly broken, as viewed along an optical axis of light from a courtesy lamp light source (that is, as viewed from obliquely underneath relative to a horizontal direction in a state in which the courtesy lamp is mounted on the vehicle)

An inner configuration of the courtesy logo lamp 10 will be described based on the exploded view in FIG. 1. Although not illustrated in FIG. 1, the outer lens 14 is provided with lens cuts. The lens cuts can be provided, for example, to each of the front and back surfaces of the outer lens 14 as illustrated in FIGS. 4, 5 and 6. In other words, in the example in FIGS. 4, 5 and 6, lens cuts 16a in a vertically striped pattern are provided to a front surface 14Va of the vertical plate 14V of the outer lens 14, and lens cuts 16b in a horizontally striped pattern are provided to a back surface 14Vb. In FIG. 1, a housing 24, a courtesy lamp PC board 26 (printed board), a logo lamp PC board 28, a logo lamp module 30, a light guide 32, etc., are housed inside the courtesy logo lamp 10. The housing 24 is formed of an integrally molded article of a synthetic resin. At an end in the left-right direction of the housing 24, a connector inlet 24a is provided so as to be open. A connector (not illustrated) at an end of a courtesy logo lamp wiring provided through the inside of the door is inserted to the connector inlet 24a. A boss 24b for screw-fastening of the logo lamp module 30 is formed in the housing 24. An LED-used courtesy lamp light source 34, a connector connection terminal 36 and circuit elements are mounted on the courtesy lamp PC board 26. An LED-used logo lamp light source 38 and circuit elements are mounted on the logo lamp PC board 28. The PC boards 26, 28 are connected to each other via a wiring 40. Drive power supplied from the connector connection terminal 36 is supplied to a circuit mounted on the courtesy lamp PC board 26 and further supplied to a circuit mounted on the logo lamp PC board 28 via the wiring 40. Consequently, in response to opening/closing of the door, the light sources 34, 38 are both turned on when the door is opened, and turned off upon lapse of the set length of time after the door is closed. The light guide 32 includes a light input surface 32a, a light guide portion 32b and a light output surface 32c. Two pins 32d, 32e provided at the periphery of the light input surface 32a of the light guide 32 are inserted to a hole 26a and a cutout 26b of the courtesy lamp PC board 26, respectively, whereby the light guide 32 is erected on the courtesy lamp PC board 26. Consequently, the light input surface 32a of the light guide 32 faces the light source 34, and the light input surface 32a is disposed orthogonal to an optical axis of the light source 34. Two pins 30a, 30a (only one shown in FIG. 1) at a rear end of the logo lamp module 30 are inserted to holes 28a, 28a of the logo lamp PC board 28, respectively, whereby the logo lamp module 30 is erected on the logo lamp PC board 28. Consequently, the light source 38 is disposed on an optical axis of the logo lamp module 30. A pattern mask in which the logo is drawn, an optical system for projecting the logo, etc., (none of which is illustrated) are housed in a lens-barrel 30b of the logo lamp module 30. In the logo lamp module 30, light from the light source 38 travels through the pattern mask. Consequently, the logo lamp light 20 can be obtained. The logo lamp light 20 is output from a projection port 30c. The courtesy lamp PC board 26 is temporarily held in the housing 24 via claw engagement. At this time, the connector connection terminal 36 is disposed in the connector inlet 24a. A non-illustrated screw is threadably inserted to the housing 24 through a screw through hole 32f (FIGS. 3A and 3C) of the light guide 32, whereby the light guide 32 is screw-fastened to the housing 24. When the light guide 32 is screw-fastened to the housing 24 via the screw, the courtesy lamp PC board 26 is interposed between the light guide 32 and the housing 24, and fixed to the housing 24 together with the light guide 32. The logo lamp PC board 28 is disposed in the housing 24 in a position in which the logo lamp PC board 28 is inclined relative to the courtesy lamp PC board 26. In this position, the logo lamp PC board 28 is fixed to the housing 24 together with the logo lamp module 30 when the logo lamp module 30 is screw-fastened to the housing 24. In other words, the logo lamp module 30 is screw-fastened to the housing 24 as a result of two screws 42, 42 being screwed into the housing 24 through screw through holes 30d, 30d formed at a side surface of the lens-barrel 30b. At this time, the logo lamp PC board 28 is interposed between the logo lamp module 30 and the housing 24 and fixed to the housing 24 together with the logo lamp module 30. After the courtesy lamp PC board 26 with the light guide 32 mounted thereon and the logo lamp PC board 28 with the logo lamp module 30 mounted thereon being fixed to the housing 24. The housing 24 and the outer lens 14 are joined to each other via claw engagement. In this way, the courtesy logo lamp 10 is integrally assembled. The connector at the end of the courtesy logo lamp wiring provided through the inside of the door is inserted to the connector inlet 24a of the assembled courtesy logo lamp 10. Next, the courtesy logo lamp 10 is inserted to a courtesy logo lamp installation opening 12c (FIG. 6) formed in the door 12 (more precisely, the door trim). After the insertion, a claw 14e formed so as to protrude on the one end side in a longitudinal direction (longitudinal direction) of the outer lens 14 is got caught at a peripheral edge of the opening 12c and a claw 14d formed on the other end side in the longitudinal direction of the outer lens 14 is engaged with a peripheral edge of the opening 12c, the peripheral edge facing the claw 14d, whereby the courtesy logo lamp 10 is installed in the door 12.

Figure 3E:
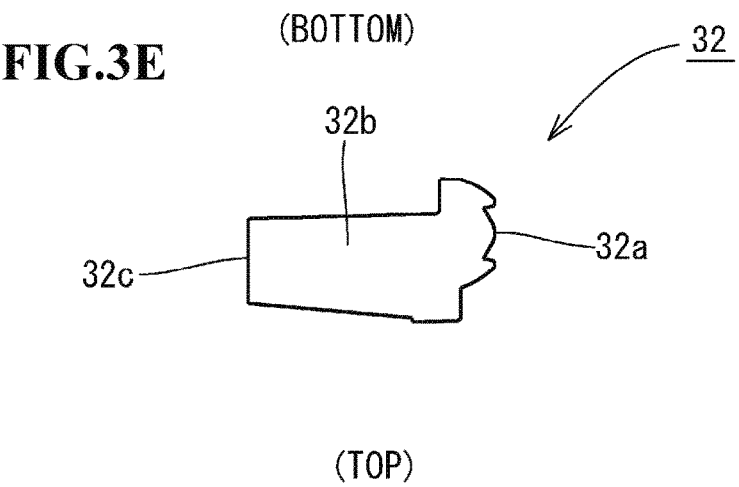

A structure of the light guide 32 will be described with reference to FIGS. 3A to 3E. The light guide 32 is formed by an integrally molded article using a transparent resin such as PMMA or polycarbonate. The light guide 32 has an arched shape in a longitudinal direction (FIG. 3D), which corresponds to a light guiding direction. In the light guide 32, the light input surface 32a, the light guide portion 32b and the light output surface 32c are aligned along the light guiding direction. The light input surface 32a has a convex lens shape having a round front shape (FIGS. 3C and 3E). The light input surface 32a coaxially faces the light source 34 (LED) (FIGS. 5 and 6), converts light radiated from the light source 34 to substantially parallel light and guides the substantially parallel light to the light guide portion 32b. A cross-sectional shape in a direction orthogonal to an optical axis of the light guide portion 32b is a substantially rectangular shape. This rectangular shape is a quadrangle having two sides substantially parallel to a plane to which the curved optical axis of the light guide portion 32b belongs and two sides substantially orthogonal to the plane. Light guided by the light guide portion 32b is reflected by a wall surface of the light guide portion 32b and guided to the light output surface 32c, and output from the light output surface 32c to the outside of the light guide 32. A front shape of the light output surface 32c is a substantially rectangular shape that is continuous with the cross-sectional shape of the light guide portion 32b (FIG. 3B). At the periphery of the light input surface 32a of the light guide 32, besides the two pins 32d, 32e, the screw through hole 32f is provided integrally with the light guide 32. As described above, the two pins 32d, 32e are intended to cause the light guide 32 to be erected on the courtesy lamp PC board 26, and the screw through hole 32f is intended to cause the screw for fixing the light guide 32 to the housing 24, to be inserted therethrough.

Arrangement of the respective components in the courtesy logo lamp 10 and radiation ranges of the courtesy lamp light 18 and the logo lamp light 20 will be described based on FIGS. 4, 5 and 6. FIG. 4 illustrates the courtesy logo lamp 10 with the outer lens partly broken, as viewed along an optical axis of light from the courtesy lamp light source 34 (that is, as viewed from obliquely underneath relative to the horizontal direction as mounted on the vehicle). FIG. 5 is a cross-sectional view at the position indicated by arrows A-A in FIG. 2 and illustrates the courtesy logo lamp 10 cut along a plane extending through the curved optical axis of the courtesy lamp light source 34. FIG. 6 is a cross-sectional view at the position indicated by arrows C-C in FIG. 4 (in a state in which the courtesy logo lamp 10 is installed in the door). In FIG. 6, as in FIG. 4, the optical axis direction of light from the courtesy lamp light source 34 (that is, the obliquely downward direction relative to the horizontal direction in a state the courtesy logo lamp 10 is mounted on the vehicle) is arranged horizontally in the sheet. As can be seen from FIG. 6, in the state in which the courtesy logo lamp 10 is mounted on the vehicle, a surface of the logo lamp PC board 28 is disposed substantially horizontally, and therefore, the optical axis of the logo lamp module 30 is arranged vertically downward. Also, a surface of the courtesy lamp PC board 26 is disposed so as to be inclined at an angle of substantially 45 degrees relative to the horizontal direction (that is, be risen from the horizontal position). In order to avoid interference with the logo lamp module 30, the courtesy lamp light source 34 is disposed at a position largely deviated rightward from a center position in the left-right direction of the courtesy logo lamp 10 (FIG. 5). The light input surface 32a of the light guide 32 faces the light source 34. Since the light guide portion 32b is arched, the light guide portion 32b obliquely approaches the center position in the left-right direction of the vertical plate 14V, which forms a transmission/diffusion portion of the outer lens 14, avoiding the logo lamp PC board 28 and the logo lamp module 30. The light output surface 32c is disposed, at a position away from the vertical plate 14V, so as to be directed toward the center position in the left-right direction of the vertical plate 14V (FIG. 5). Consequently, the cross-sectional area of the courtesy lamp light 18 output obliquely relative to the surface of the vertical plate 14V from the light output surface 32c is increased until the courtesy lamp light 18 reaches the vertical plate 14V. The courtesy lamp light 18 whose cross-sectional area has been increased is applied to the back surface 14Vb of the vertical plate 14V with the center position in a top-bottom direction and the left-right direction of the vertical plate 14V as a center position of the application (FIGS. 5 and 6). The courtesy lamp light 18 applied to the back surface 14Vb is diffused by the lens cuts 16b in the horizontally striped pattern in the back surface 14Vb and the lens cuts 16a in the vertically striped pattern in the front surface 14Va while penetrating the vertical plate 14V, and radiated to the outside. Consequently, the entire area of the vertical plate 14V looks luminous with the center position of the vertical plate 14V as a center of emission as viewed from the outside on the front side of the vertical plate 14V. In other words, the entire area of the vertical plate 14V forms a light-emitting surface. While only the light output surface 32c of the light guide 32 emits light if no vertical plate 14V is provided, the provision of the vertical plate 14V enables provision of a wide light-emitting surface despite the light guide 32 has a small size. A part of the courtesy lamp light 18 penetrates the textured surface of the lower plate 14H of the outer lens 14 and is radiated toward the ground, but an amount of the part of the courtesy lamp light 18 is smaller than an amount of the courtesy lamp light 18 radiated from the vertical plate 14V. On the other hand, the logo lamp light 20 output from the projection port 30c of the logo lamp module 30 is output from the transparent window 14c of the lower plate 14H of the outer lens 14 toward the ground just below in the vertical direction. Consequently, the logo 22 (FIG. 2) is projected on the ground.

FIG. 6 indicates a radiation range 18A of the courtesy lamp light 18 output from the light output surface 32c of the light guide 32 and a radiation range 20A of the logo lamp light 20 in a vertical direction. Since a radiation direction and a radiation angle of the courtesy lamp light 18 are controlled by the light guide 32, the radiation range 18A of the courtesy lamp light 18 does not overlap the radiation range 20A of the logo lamp light 20. Therefore, the courtesy lamp light 18 and the logo lamp light 20 do not intensely interfere with each other, and thus, the logo 22 is clearly displayed on the ground. Here, as a result of the diffusion of the courtesy lamp light 18 by the lens cuts 16b, 16a of the vertical plate 14V, a part of the courtesy lamp light 18 leaks to the outside of the radiation range 18A and interferes with the logo lamp light 20. However, the degree of such interference is low and thus not enough to blur the logo 22. Rather, a stage effect of the logo 22 being looked as if it is floating on the ground slightly illuminated with the leaked light of the courtesy lamp light 18 can be expected. Here, a range 18B in FIG. 6 indicates a radiation range of the courtesy lamp light 18 radiated from the light source 34 where no light guide 32 is provided. According to this, if no light guide 32 is provided, the radiation range 18B of the courtesy lamp light 18 and the radiation range 20A of the logo lamp light 20 overlap each other. Thus, it can be predicted that the courtesy lamp light 18 and the logo lamp light 20 intensely interfere with each other, which cause the logo 22 to be blurred (that is, the logo 22 is blurred by the bright courtesy lamp light 18).

«Embodiment of Courtesy Lamp»

Figure 7:
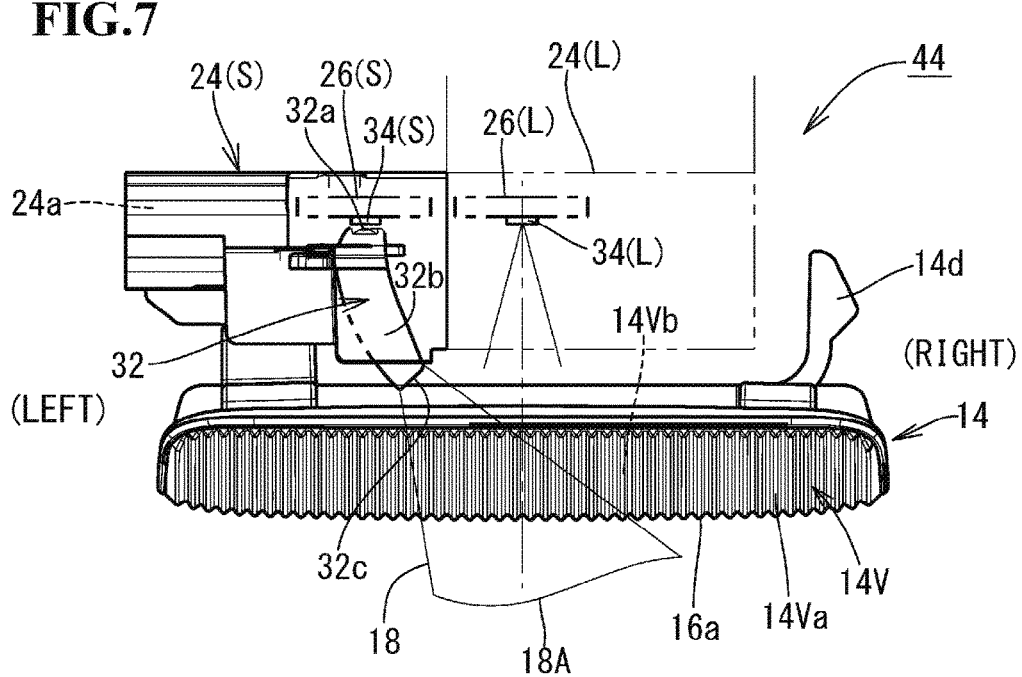
FIG. 7 is a plan view illustrating an embodiment of a courtesy lamp according to this invention.
Figure 8:
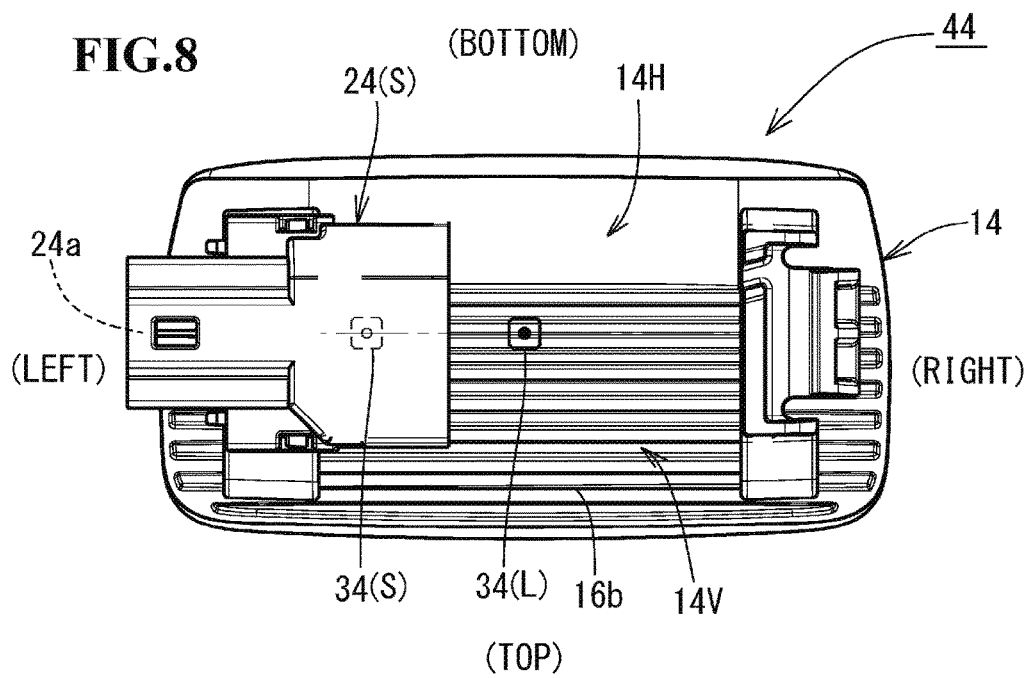
FIG. 8 is a back view of the courtesy lamp in FIG. 7 (where the upper side of the sheet is the ground side).

FIGS. 7 and 8 indicate an embodiment of a courtesy lamp according to this invention. In FIGS. 7 and 8, the parts that are in common with the embodiment of the courtesy logo lamp are provided with reference numerals that are the same as those used in the embodiment of the courtesy logo lamp, respectively. Accordingly, description of such common parts will be omitted. A courtesy lamp 44 according to this embodiment is one resulting from removing the logo lamp in the embodiment of the courtesy logo lamp and reducing the length in the left-right direction of the housing. In the courtesy lamp 44, a length in a left-right direction of a housing 24 (S) is around a half of an entire length in a left-right direction of the courtesy lamp 44. The housing 24 (S) is attached to an outer lens 14 at a position on the one side in the left-right direction of the outer lens 14. A connector inlet 24a is formed at an end of the outer lens 14. A light source 34 (S) mounted on a courtesy lamp PC board 26 (S) is also disposed at a position on the one side in the left-right direction of the outer lens 14. Light radiated from the courtesy lamp light source 34 (S) enters a light input surface 32a of a light guide 32. The entered light obliquely guided toward a center position in the left-right direction of the outer lens 14, by a light guide portion 32b. The guided light is output from a light output surface 32c at a position away from a back surface 14Vb of a vertical plate 14V of the outer lens 14. The cross-sectional area of the emitted light increases and the emitted light is obliquely applied to a center position in the left-right direction of the back surface 14Vb of the vertical plate 14V of the outer lens 14. Where no light guide 32 is used, as indicated in FIG. 7, it is necessary to configure a long housing 24 (L) in order to dispose a light source 34 (L) mounted on a courtesy lamp PC board 26 (L) at the center position in the left-right direction of the outer lens 14. As a result, the housing 24 (L) becomes large. Incidentally, the housing 24 (e.g., FIGS. 1 and 5) in the embodiment of the courtesy logo lamp can also be configured to be short as in the housing 24 (S).

Although in the above embodiments, a transmission/diffusion portion is disposed in the entire area of the vertical plate of the outer lens, instead of this, a transmission/diffusion portion can be disposed only in a partial area of the vertical plate. Although in the above embodiments, the entire area of the vertical plate of the outer lens is permeable in a front-back direction, instead of this, a center area of the vertical plate to which light output from the light output surface of the light guide is applied can be made to be permeable in the front-back direction, and a reflective film can be formed on an area of the back surface except the center. With such configuration, also, light entered from the center of the back surface of the outer lens is reflected by the reflective film and diffused to the periphery, and thus, the entire area of the front surface of the outer lens can be made to be luminous. Although in the above embodiments, lens cuts are provided to the transmission/diffusion portion, instead of the lens cuts or together with the lens cuts, e.g., a textured surface or a matted surface (e.g., a frosted surface, a sandblasted surface, a matte clear coating surface, and a matte film-attached surface) can be used. Also, instead of or in addition to a surface of the outer lens having a light diffusion property, a lacteous material or a material with a diffusing agent mixed therein can be used for the outer lens to form a transmission/diffusion portion. Also, separately from the transmission/diffusion portion of the outer lens, the light output surface of the light guide can be made to be a light diffusing surface such as a surface with lens cuts, a textured surface, a matted surface (that is, e.g., a frosted surface, a sandblasted surface, a matte clear coating surface or a matte film-attached surface). Also, a reflective film is formed on an entire periphery of a surface of the light guide portion of the light guide to efficiently guide light from the light source to the light output surface of the light guide. Although in the above embodiments, as the light guide, one having an arched shape in the longitudinal direction and including a light guide portion having a rectangular shape in a cross-section in the direction orthogonal to the optical axis, in this invention, the shape of the light guide is not limited to this and any of various shapes can be used. Although in the above embodiments, no other member is disposed between the light output surface of the light guide and the outer lens, another member such as a lens, a light diffusion sheet or a mirror can be interposed between the light output surface of the light guide and the outer lens as necessary. Although in the above embodiments, the outer lens is exposed to the outside, in this invention, another light transmissive member such as a transparent cover can be disposed on the outer side of the outer lens. Although in the above embodiment of the courtesy logo lamp, a partition such as a partition sheet is not used, this invention is not intended to exclude a configuration using a partition such as a partition sheet. In other words, if it is desired that courtesy lamp light and logo lamp light are more clearly separated from each other, a partition such as a partition sheet can be disposed between the logo lamp module and the light guide.

What is claimed is:

1. A courtesy lamp configured to be installed in a part on an interior side of a door of a vehicle, the courtesy lamp comprising: a light source, a light guide and an outer lens, wherein:

the light guide includes a light input surface that allows input of light from the light source, a light guide portion that has a longitudinal shape in a light guiding direction and guides the light input from the light input surface, a wall surface of the light guide portion, the wall surface reflecting the light while the light is guided by the light guide portion, and a light output surface that allows output of the light guided by the light guide portion; and the outer lens includes a transmission/diffusion portion that allows the light output from the light output surface of the light guide to enter a back surface of the outer lens, penetrate the outer lens in a thickness direction, diffuse in the outer lens and radiate from a front surface of the outer lens to an outside, wherein the light source is disposed at a position deviated from a center position in a left-right direction of the outer lens, wherein the left-right direction is perpendicular to a central axis that coincides with the center position, and wherein the central axis extends in the thickness direction of the outer lens, and wherein the light guide allows input of the light from the light source from the light input surface, guides the light via the light guide portion and allows output of the light from the light output surface toward the center position in the left-right direction of the back surface of the outer lens.

2. The courtesy lamp according to claim 1, wherein the light output surface of the light guide is disposed at a position substantially away from the back surface of the outer lens, and the light output from the light output surface is directed to the back surface of the outer lens.

3. The courtesy lamp according to claim 1, wherein the light guide includes the light input surface in one end surface in a longitudinal direction of the light guide and the light output surface in another end surface in the longitudinal direction.

4. A courtesy logo lamp comprising a courtesy lamp according to claim 1, a logo lamp module being assembled integrally with the courtesy lamp.

5. A courtesy logo lamp comprising a courtesy lamp according to claim 2, a logo lamp module being assembled integrally with the courtesy lamp.

6. A courtesy logo lamp comprising a courtesy lamp according to claim 3, a logo lamp module being assembled integrally with the courtesy lamp.

7. The courtesy logo lamp according to claim 4, wherein the light output surface of the light guide is disposed at a position enabling the light output from the light output surface to reach the transmission/diffusion portion of the outer lens without being blocked by at least one of the logo lamp module and a substrate with the logo lamp module mounted thereon.

8. The courtesy logo lamp according to claim 5, wherein the light output surface of the light guide is disposed at a position enabling the light output from the light output surface to reach the transmission/diffusion portion of the outer lens without being blocked by at least one of the logo lamp module and a substrate with the logo lamp module mounted thereon.

9. The courtesy logo lamp according to claim 6, wherein the light output surface of the light guide is disposed at a position enabling the light output from the light output surface to reach the transmission/diffusion portion of the outer lens without being blocked by at least one of the logo lamp module and a substrate with the logo lamp module mounted thereon.

10. The courtesy logo lamp according to claim 4, wherein:
the logo lamp module is arranged at the center position in the left-right direction of the outer lens.

11. The courtesy logo lamp according to claim 5, wherein:
the logo lamp module is arranged at the center position in the left-right direction of the outer lens.

12. The courtesy logo lamp according to claim 6, wherein:
the logo lamp module is arranged at the center position in the left-right direction of the outer lens.

13. The courtesy logo lamp according to claim 4, wherein the transmission/diffusion portion of the outer lens has a symmetrical shape in the left-right direction, and wherein an orientation of an image projected from the logo lamp module is configured to be set as a direction in which a person getting on or off the vehicle looks toward a surface on the interior side of the door.

14. The courtesy logo lamp according to claim 5, wherein the transmission/diffusion portion of the outer lens has a symmetrical shape in the left-right direction, and wherein an orientation of an image projected from the logo lamp module is configured to be set as a direction in which a person getting on or off the vehicle looks toward a surface on the interior side of the door.

15. The courtesy logo lamp according to claim 6, wherein the transmission/diffusion portion of the outer lens has a symmetrical shape in the left-right direction, and wherein an orientation of an image projected from the logo lamp module is configured to be set as a direction in which a person getting on or off the vehicle looks toward a surface on the interior side of the door.

16. The courtesy lamp according to claim 1, wherein the light guide has a curved shape in a longitudinal direction corresponding to a light guiding direction.

17. A courtesy logo lamp comprising a courtesy lamp according to claim 16, a logo lamp module being assembled integrally with the courtesy lamp.

* * * * *